June 19, 1945.  A. ROSS  2,378,659

THREAD CUTTING ATTACHMENT FOR LATHES AND THE LIKE

Filed March 11, 1944

INVENTOR
Andrew Ross
by Fetherstonhaugh
Att'ys

Patented June 19, 1945

2,378,659

UNITED STATES PATENT OFFICE 2,378,659

THREAD CUTTING ATTACHMENT FOR LATHES AND THE LIKE

Andrew Ross, Toronto, Ontario, Canada, assignor to Leonard Henry Andrews, Weston, Ontario, Canada Application March 11, 1944, Serial No. 526,060

2 Claims. (Cl. 10—89)

This invention relates to thread cutting attachments for lathes and the like.

Up to the present time, it has been usual for thread cutting purposes to employ special apparatus such as expanding and contracting die heads, special tappet machines or the like, which requires the use of expensive turret and automatic machinery and equipment. This presents many disadvantages, such as the necessity of restricting special thread cutting to special establishments having this machinery installed, the necessity of delay where spare parts, etc. for such equipment has to be ordered and cannot be obtained immediately, the cost of producing small jobs with such equipment, and the necessity in most cases of employing skilled operators. The necessity of employing such equipment and its disadvantages are avoided by means of the present invention.

It is an object of the present invention to provide a simple attachment for lathes and the like through which, in combination with ordinary standard thread cutting elements, threading operations may be readily carried out.

A further object of the invention is to provide an attachment of this kind which eliminates the necessity of skilled operators and expensive set-up men.

A still further object of the invention is to provide attachments which may be employed generally in machine shops and which will permit the production, even of small orders, with good delivery at prices that would prohibit the setting up of automatic equipment.

With these and other objects in view, the invention generally comprises an attachment employing a body having a head connected therewith in slidable and rotatable relation, the head being designed operatively to carry thread cutting means and the body attachable to a lathe or the like to locate the thread cutting means in cooperative thread-cutting relation with the material carried by the lathe for thread cutting purposes, the head being slidable to two opposed positions to engage clutch means for locking the head against rotation relatively to the body when in either of said positions and being rotatable relatively to the body when slid to an intermediate position.

In this way provision is made for engaging the material in thread cutting relation as well as disengaging it including a period of operation for free rotation of the head between the engaging and disengaging operation.

The invention will be clearly understood by reference to the following detailed specification taken in conjunction with the accompanying drawing.

Figure 1:
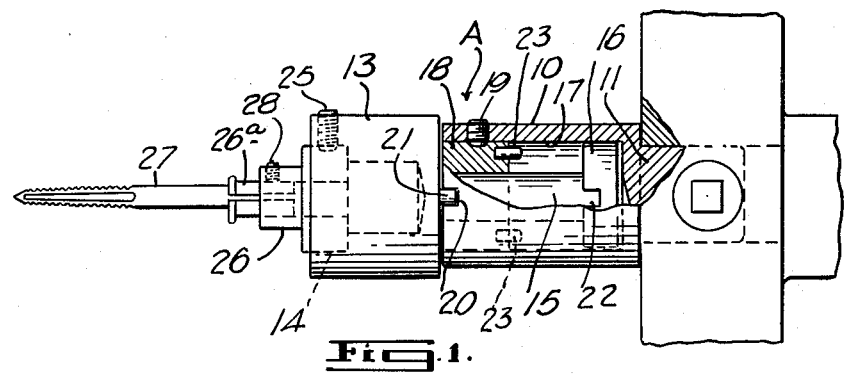
Fig. 1 is a side elevation partly in section of the attachment according to the present invention carrying a tap for internal screw threading, the attachment being mounted in a socket of a turret lathe.

Referring to the drawing, A indicates the thread cutting attachment for lathes as a whole which employs a body 10 formed with a suitable shank or other connecting fitting 11 which in the present illustration is shown connected in a socket of a turret lathe. The body 10 has connected therewith a head 13 formed with a suitable socket indicated at 14 for receiving thread cutting attachments as hereinafter referred to.

The head 13, in the preferred form of construction illustrated, is provided with an axially projecting shank 15 formed with the radially projecting enlargement or fitting 16 which is designed to slidably fit within the bore 17 of the body. At the open end of the body 10 a suitable bushing 18 is mounted, secured in any suitable way, such as by the grub screw 19. The bushing is provided with a central bore coinciding with the diameter of the shank 15 of the head 13 so as to provide for a sliding fit.

The face of the outer end of the body and the outer face of the bushing are preferably formed with a common slot 20, while the inner face of the head is provided with a pair of diametrically opposed projecting pins 21 designed to fit within the slot 20 in order to lock the head against rotation relatively to the body 10 when the head is in normal thread cutting position.

The outer face of the enlargement or fitting 16 on the shank 15 is likewise provided with a slot, sections of which extend diametrically to one another on opposite sides of the shank 15. Cooperating with the slot 22 are the projecting pins 23 which project from the inner face of the bushing 18. Thus, if the head is moved axially outwardly (Fig. 2) the enlargement or fitting 16 when it engages the pins 23 of the bushing 18, and is turned if necessary, will result in the pins 23 entering the slot 22. Consequently, the head in this position is locked against rotary movement relatively to the body 10. However, when the head 13 is moved axially only to a limited degree to an intermediate position, such that neither the pins 21 nor the pins 23 engage in their corresponding slots 20 and 22, respectively, the head is capable of rotation relatively to the body 10. It is apparent, therefore, that the head is mounted in full floating relation to the body, movable to two opposed positions whereby it is locked against rotary movement relatively to the body and, in an intermediate position, is unlocked and rotatable. Thus, the pins 21 and 23, when cooperating with their respective slots 20 and 22 form a double clutch operable in two different positions of the head.

Figures 2, 3:
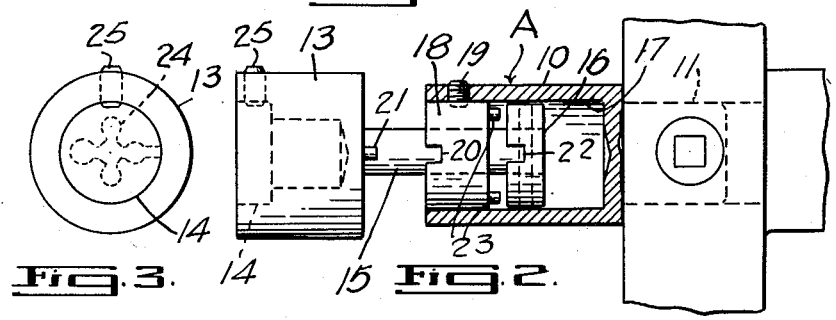
Fig. 2 is a view similar to Fig. 1 but showing the head of the attachment displaced laterally and in effect carrying a button die for external threading.
Fig. 3 is an end elevation of Fig. 2 with button die partly illustrated by means of dotted lines.

The socket 14 in the head is designed, on the one hand, to receive button dies for external threading, as indicated at 24, Fig. 3, which dies are standard equipment in all shops. These may be fastened in by a suitable grub screw as indicated at 25. On the other hand, by use of suitable adapters socket 14 readily carries standard taps for internal threading. In Fig. 1 a suitable adapter 26 is fastened by the grub screw 25, the adapter fastening the split sleeve 26ª for clamping the standard tap 27, and a suitable grub screw 28 may fasten the sleeve 26ª. Thus the attachment either through a standard tap such as 27 or through a button die 24 can be employed to cut internal or external threads. It is capable of using a range of button dies from the largest, which may be practical with a construction of the kind in question, to the smallest, while the same is true in respect to using a range of taps for internal threading.

Figures 4, 5:
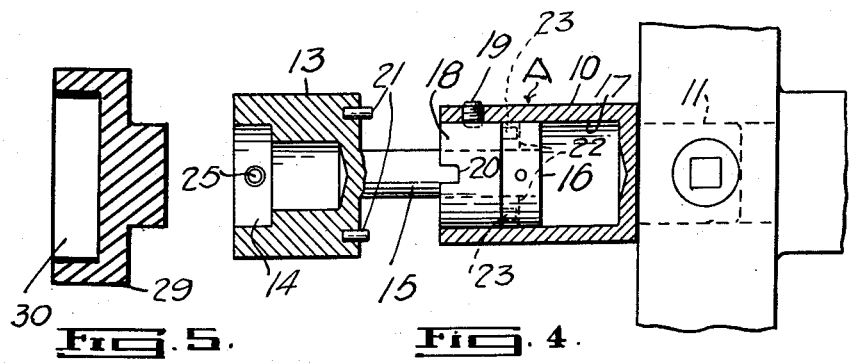
Fig. 4 is a view similar to Fig. 2 but showing the head moved laterally to its extreme outer position, and, Fig. 5 is a transverse section taken through an adapter for use with the attachment designed to carry larger button dies.

For button dies of a size larger than the socket 14 the adapter such as illustrated in Fig. 5 by the numeral 29, may be employed. This adapter has a socket 30 and a projecting shank which may be fitted in the socket 14 and fastened by the grub screw 25.

Likewise by provision of an adapter connected to the shank 11 of the body 10 the attachment can be carried by the tail stock of the ordinary lathe.

The operation of the attachment is very simple entailing no mathematical computations and little operational knowledge such that it can be used with efficiency by relatively inexperienced help and does not require skilled operators.

In the cutting of either external or internal threads the attachment employs the appropriate cutting member fastened in a suitable manner such as described. The material for thread cutting purposes is rotated in the lathe in the normal manner and the attachment is fed to the material to cut the thread over the desired area of the material. In this operation the pins 21 engaged in the slot 20 will maintain the head 13 locked stationary with the body 10, thus the material rotating in contact with the thread cutter will effect the thread cutting. By use of a suitable stop on the lathe, positioned to stop the feeding movement of the attachment at a point substantially coinciding with the length of thread it is desired should be cut, but just short thereof a distance corresponding to the length of pins 21, a thread of the desired length is produced. When the feeding movement of the attachment is stopped the head in its continued slight movement, corresponding to the length of the pins 21, disengages the latter from the slot 20 such that the head 13 is then rotatable relatively to the body 10 so that it will turn with the rotating material.

Upon reversing the feed of the attachment and rotation of the material, the enlargement or fitting 16 on the end of the shank 15 will be pulled into engagement with the pins 23 of the bushing 18 at which time the slot 22 will be brought into registry with the pins so that they enter it, whereupon the head 13 is again locked against rotation relatively to the body 10. The thread cutter, therefore, is readily withdrawn from the material as the cutter rotates. It is apparent, therefore, that with this attachment threading of a required length can be effected in a simple manner for innumerable repeat operations merely by setting the stop member on the lathe.

The foregoing clearly illustrates the principle of the present invention and demonstrates its simplicity of construction and operation. It will be obvious from this that the use of standard button dies and standard tap sizes in conjunction with the attachment permits an operator to go into production immediately eliminating delay for die head chasers and expensive fixtures. It also eliminates the expense of one purpose tools such as die heads, chasers used for one job, and tapping machines, etc., while tapping machines for special purposes are not left idle in a shop waiting for the special work for which they are adapted.

It is also obvious that the operation and maintenance of the attachment presents no problem, entails no mathematical computations and little operational knowledge, while it obviates the necessity of experts for setting up and changing it over for different work. Similarly, it eliminates the necessity for highly trained operators.

It is, of course, apparent that changes in the structure may be made without departing from the principle of the invention.

What I claim as my invention is:

1. A threading attachment for lathes and the like comprising a body having a head connected therewith in slidable and rotatable relation, said head being designed operatively to carry thread cutting means, said body being attachable to the lathe to locate said thread cutting means in cooperative thread cutting relation with material carried by the lathe for thread cutting purposes, said body being formed with a bore, a bushing carried within the bore adjacent an end of the body, said head having a shank projecting from a face thereof, said shank having a radially projecting cylindrical fitting of a diameter slidably to fit within the bore of the body, said shank being of a diameter slidably to fit within the opening of the bushing, said face of the head being formed with projecting pins, said end of the body being slotted to receive the pins of the head to lock the latter against rotation relatively to the body, said bushing having pins projecting therefrom within the bore of said body, said fitting being slotted, said head being movable from one extreme position to disengage its pins from the slot formation of the body and movable to an extreme opposed position to engage the slot formation of the fitting with the pins of said bushing whereby to lock the head against rotation relatively to the body, said head being movable to a position intermediate the two extreme opposed positions to disengage the pin and slot formations and render said head rotatable relatively to the body.

2. A threading attachment for lathes and the like comprising a body having a head connected therewith in slidable and rotatable relation, said head being designed operatively to carry thread cutting means, said body being attachable to the lathe to locate said thread cutting means in cooperative thread cutting relation with material carried by the lathe for thread cutting purposes, said head having an axially projecting shank terminating in a radially projecting cylindrical fitting, a face of said head being formed with projecting pins, a cooperating portion of said body being slotted to receive the pins of the head to lock the latter against rotation relatively to said body, the latter having a hollow bore of a diameter substantially corresponding to the diameter of said fitting and a centrally restricted passage, opening into the bore, of a diameter substantially corresponding to the diameter of said shank, said shank and fitting being mounted respectively in said restricted passage and said bore, for slidable movement relatively to said body, pins projecting inwardly into the bore from said body, said fitting being slotted to cooperate with said latter pins, said head being movable from one extreme position, to disengage its pins from the slot formation of the body, and movable to an extreme opposed position to engage the slot formation of the fitting with the inwardly directed pins of said body, said head being movable to a position, intermediate the two extreme opposed positions, to disengage the pins and slot formations and render said head rotatable relatively to the body.

ANDREW ROSS.